United States Patent
Kim et al.

(10) Patent No.: US 10,850,745 B2
(45) Date of Patent: Dec. 1, 2020

(54) APPARATUS AND METHOD FOR RECOMMENDING FUNCTION OF VEHICLE

(71) Applicants: HYUNDAI MOTOR COMPANY, Seoul (KR); KIA MOTORS CORPORATION, Seoul (KR)

(72) Inventors: Bi Ho Kim, Hwaseong-si (KR); Sung Soo Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 199 days.

(21) Appl. No.: 16/126,769

(22) Filed: Sep. 10, 2018

(65) Prior Publication Data

US 2019/0135304 A1 May 9, 2019

(30) Foreign Application Priority Data

Nov. 7, 2017 (KR) .................. 10-2017-0147438

(51) Int. Cl.
| | | |
|---|---|---|
| *B60W 50/10* | (2012.01) | |
| *B60W 50/14* | (2020.01) | |
| *G10L 15/22* | (2006.01) | |
| *G10L 15/26* | (2006.01) | |
| *G06F 40/35* | (2020.01) | |
| *G10L 15/18* | (2013.01) | |
| *G10L 25/63* | (2013.01) | |

(52) U.S. Cl.
CPC .......... *B60W 50/10* (2013.01); *B60W 50/14* (2013.01); *G06F 40/35* (2020.01); *G10L 15/1822* (2013.01); *G10L 15/22* (2013.01); *G10L 15/26* (2013.01); *B60W 2050/146* (2013.01); *G10L 25/63* (2013.01); *G10L 2015/223* (2013.01)

(58) Field of Classification Search
CPC .......... B60W 2050/146; B60W 50/10; B60W 50/14; G06F 40/35; G10L 15/1822; G10L 15/22; G10L 15/26; G10L 2015/223; G10L 25/63
See application file for complete search history.

(56) References Cited

U.S. PATENT DOCUMENTS 8,407,057 B2 * 3/2013 Comerford ............. G10L 15/06
    704/275
9,466,295 B2 * 10/2016 Zhang .................... G10L 15/22

(Continued)

*Primary Examiner* — Tyler J Lee
(74) *Attorney, Agent, or Firm* — Morgan, Lewis & Bockius LLP (57) ABSTRACT

An apparatus for recommending a function of a vehicle includes an input module, a memory, an output module, and a processor. The processor obtains intention information indicating an action associated with each of a plurality of sentences, nuance information indicating a positive, neutral, or negative meaning included in each of the plurality of sentences, and one or more keywords for executing a function associated with the intention information among a plurality of functions embedded in the vehicle by analyzing each of the plurality included in the conversation, determines a task, associated with the function, to be recommended to at least some of the plurality of users, based on the intention information, the nuance information, and the one or more keywords, and outputs a message of recommending the task using the output module, when the end of the conversation is recognized.

22 Claims, 9 Drawing Sheets

(56) References Cited

U.S. PATENT DOCUMENTS

| | | | |
|---|---|---|---|
| 9,646,000 B2* | 5/2017 | Zhang | G06F 40/211 |
| 2008/0235017 A1* | 9/2008 | Satomura | G10L 15/22 |
| | | | 704/246 |
| 2009/0204395 A1* | 8/2009 | Kato | G10L 13/033 |
| | | | 704/206 |
| 2010/0185445 A1* | 7/2010 | Comerford | G10L 15/22 |
| | | | 704/251 |
| 2010/0198093 A1* | 8/2010 | Katayama | G10L 15/22 |
| | | | 600/519 |
| 2016/0336009 A1* | 11/2016 | Takei | B60K 35/00 |
| 2016/0379634 A1* | 12/2016 | Yamamoto | G10L 15/22 |
| | | | 704/251 |
| 2017/0103756 A1* | 4/2017 | Kobayashi | G10L 15/30 |
| 2017/0169823 A1* | 6/2017 | Neff | G10L 15/22 |
| 2018/0090140 A1* | 3/2018 | Georges | G10L 15/22 |
| 2018/0173494 A1* | 6/2018 | Choi | G10L 15/08 |
| 2018/0182382 A1* | 6/2018 | Lee | G06F 40/35 |
| 2018/0204572 A1* | 7/2018 | Manabe | G10L 15/30 |
| 2019/0027137 A1* | 1/2019 | Sohn | G10L 15/22 |
| 2019/0323854 A1* | 10/2019 | Tamai | G06F 3/16 |

\* cited by examiner

| RECOMMENDTION FUNCTION | DETERMINED INTENTION | | | |
|---|---|---|---|---|
| | MOVEMENT | USE OF NAVIGATION | DESTINATION | PLACE |
| NAVIGATION | | | | |
| MEDIA PLAYBACK | LISTENING TO MUSIC | SING | | |
| SCHEDULING | PROMISE | SCHEDULE RESERVATION | MEETING | |
| TEMPERATURE CONTROL | COLD | HEAT | | |

FIG.6

| SPEAKER | | PLACE | CORRELATION | INTENTION | NUANCE |
|---|---|---|---|---|---|
| 1 | HEY, DO YOU WANNA GO TO CAFÉ A NOW? (SENTENCE 1) | CAFÉ A | | ROUTE GUIDANCE | NEUTRAL |
| 2 | NO, THAT PLACE IS BAD. (SENTENCE 2) | THAT PLACE (CAFÉ A) | Y | | NEGATIVE |
| 2 | CAFÉ B IS BETTER. (SENTENCE 3) | CAFÉ B | Y | | POSITIVE |
| 1 | YES, CAFÉ B IS BETTER. (SENTENCE 4) | CAFÉ B | Y | | POSITIVE |
| 2 | CAFÉ C? (SENTENCE 5) | CAFÉ C | Y | | NEUTRAL |
| 1 | I DON'T LIKE THAT PLACE. (SENTENCE 6) | THAT PLACE (CAFÉ C) | Y | | NEGATIVE |
| 2 | WELL, THEN, LET'S GO THERE. (SENTENCE 7) | <END OF CONVERSATION> | | | |

APPARATUS AND METHOD FOR RECOMMENDING FUNCTION OF VEHICLE

CROSS-REFERENCE TO RELATED APPLICATION

This application is based on and claims the benefit of priority to Korean Patent Application No. 10-2017-0147438, filed on Nov. 7, 2017, in the Korean Intellectual Property Office, the disclosure of which is incorporated herein in its entirety by reference.

TECHNICAL FIELD

The present disclosure relates to an apparatus and method for automatically recommending a task based on a conversation of a user of a vehicle.

BACKGROUND

With the development of the auto industry, a system for recognizing a conversation (e.g., a voice or character) of a user in a vehicle, determining his or her intention based on the recognized conversation, and automatically recommending a function embedded in the vehicle, matched with the intention, has been developed to provide convenience to a driver. The function (e.g., a route guidance function) embedded in the vehicle may support a variety of tasks (e.g. route guidance to point A). The above-mentioned system may recommend a task (e.g., route guidance to point A, playback of music of a specific genre, registration of a schedule for a specified date, operation of an air conditioner, or the like) associated with various functions, for example, route guidance, media playback, scheduling, or temperature control. The system may predict an action of the user based on information included in his or her conversion and may recommend a task associated with a function corresponding to the predicted action.

A conventional conversation-based recommendation system may recognize a keyword which appears last or a keyword which appears most frequently among the same type of keywords (e.g., place keywords) included in a conversation and may predict an action of the user based on the recognized keyword. However, since accuracy of predicting an action is not ensured by the above-mentioned manner, there is a high probability of recommending a task which is not matched with an intention of the user.

SUMMARY

The present disclosure has been made to solve the above-mentioned problems occurring in the prior art while advantages achieved by the prior art are maintained intact.

An aspect of the present disclosure provides an apparatus and method for recommending a function of a vehicle to enhance accuracy of determining an intention of a user based on a conversation of the user.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for recommending a function of a vehicle may include: an input module for detecting a conversation among a plurality of users, a memory for storing information associated with the conversation, an output module, and a processor communicatively connected with the input module, the memory, and the output module. The processor may be configured to obtain intention information indicating an action associated with each of a plurality of sentences, nuance information indicating a positive, neutral, or negative meaning included in each of the plurality of sentences, and one or more keywords for executing a function associated with the intention information among a plurality of functions embedded in the vehicle by analyzing each of the plurality included in the conversation, determine a task, associated with the function, to be recommended to at least some of the plurality of users, based on the intention information, the nuance information, and the one or more keywords, and output a message of recommending the task through the output module, where an end of the conversation is recognized.

In an embodiment, the processor may be further configured to obtain the plurality of sentences from a telephone call conducted in the vehicle using the input module.

In an embodiment, the processor may be further configured to obtain the plurality of sentences from a text received by the input module.

In an embodiment, the processor may be further configured to obtain the plurality of sentences from speaking of the plurality of users, the speaking occurring in the vehicle using the input module.

In an embodiment, the processor may be further configured to obtain the intention information indicating the action matched with each of the plurality of sentences by comparing a word included in each of the plurality of sentences with a database stored in the memory.

In an embodiment, the processor may be further configured to obtain correlation information indicating a correlation with a previous sentence from each of the plurality of sentences and determine the task based on the intention information, the nuance information, the one or more keywords, and the correlation information.

In an embodiment, the processor may be further configured to obtain intention information from a first sentence among the plurality of sentences, obtain intention information from a second sentence subsequent to the first sentence among the plurality of sentences, and disregard or delete intention information, nuance information, and one or more keywords obtained from each of sentences preceding the second sentence, where the intention information obtained from the first sentence differs from the intention information obtained from the second sentence.

In an embodiment, the processor may be further configured to obtain text data from each of the plurality of sentences, obtain emotion information about each of the plurality of sentences by analyzing the text data, and obtain the nuance information based on the emotion information.

In an embodiment, the processor may be further configured to obtain text data from each of the plurality of sentences and obtain the nuance information about each of the plurality of sentences by comparing the text data with a database stored in the memory.

In an embodiment, the processor may be further configured to obtain the nuance information about each of the plurality of sentences based on a waveform of a voice corresponding to each of the plurality of sentences detected by the input module.

In an embodiment, the processor may be further configured to determine a function mapped with the intention information, obtain the one or more keywords from each of the plurality of sentences for executing the function mapped with the intention information, and determine the task associated with the function based on the nuance information and the one or more keywords.

In an embodiment, the processor may be further configured to determine a type of the one or more keywords based on the intention information.

In an embodiment, the processor may be further configured to obtain nuance information and one or more keywords from a first sentence among the plurality of sentences, obtain nuance information from a second sentence subsequent to the first sentence among the plurality of sentences, replace one or more keywords obtained from a sentence preceding the first sentence with the one or more keywords obtained from the first sentence, where it is determined that the second sentence has a positive meaning based on the nuance information obtained from the second sentence, and disregard or delete the one or more keywords obtained from the first sentence, where it is determined that the second sentence has a negative meaning based on the nuance information obtained from the second sentence.

According to another aspect of the present disclosure, a method for recommending a function of a vehicle may include: obtaining, by a processor, intention information indicating an action associated with each of a plurality of sentences, nuance information indicating a positive, neutral, or negative meaning included in each of the plurality of sentences, and one or more keywords for executing a function associated with the intention information among a plurality of functions embedded in the vehicle by analyzing each of the plurality included in a conversation among a plurality of users, the conversation being detected by the vehicle, determining, by the processor, a task, associated with the function, to be recommended to at least some of the plurality of users, based on the intention information, the nuance information, and the one or more keywords, and outputting, by the processor, a message of recommending the task, where an end of the conversation is recognized.

In an embodiment, the method may further include obtaining the plurality of sentences from a telephone call performed in the vehicle or speaking occurred in the vehicle.

In an embodiment, the obtaining may include obtaining the intention information indicating the action matched with each of the plurality of sentences by comparing a word included in each of the plurality of sentences with a previously stored database.

In an embodiment, the method may further include obtaining correlation information indicating a correlation with a previous sentence from each of the plurality of sentences. The determining may include determining the task based on the intention information, the nuance information, the one or more keywords, and the correlation information.

In an embodiment, the obtaining may include obtaining intention information from a first sentence among the plurality of sentences, obtaining intention information from a second sentence subsequent to the first sentence among the plurality of sentences, and disregarding or deleting intention information, nuance information, and one or more keywords obtained from each of sentences preceding the second sentence, when the intention information obtained from the first sentence differs from the intention information obtained from the second sentence.

In an embodiment, the obtaining may include obtaining nuance information and one or more keywords from a first sentence among the plurality of sentences, obtaining nuance information from a second sentence subsequent to the first sentence among the plurality of sentences, replacing one or more keywords obtained from a sentence preceding the first sentence with the one or more keywords obtained from the first sentence, when it is determined that the second sentence has a positive meaning based on the nuance information obtained from the second sentence, and disregarding or deleting the one or more keywords obtained from the first sentence, when it is determined that the second sentence has a negative meaning based on the nuance information obtained from the second sentence.

According to another aspect of the present disclosure, an apparatus for recommending a function of a vehicle may include: a microphone configured to detect speaking of one or more users, a memory storing information associated with the speaking, an output module configured to include at least a portion of a speaker or a display, and a processor communicatively connected with the microphone, the memory, and the output module. The processor may be configured to perform speech recognition for a plurality of sentences included in the speaking based on the speaking, obtain intention information indicating an action associated with each of the plurality of sentences, nuance information indicating a positive, neutral, or negative meaning included in each of the plurality of sentences, and one or more keywords for executing a function associated with the intention information among a plurality of functions embedded in the vehicle by analyzing waveform data corresponding to the speaking or text data obtained by the speech recognition, determine a task, associated with the function, to be recommended to at least some of the plurality of users, based on the intention information, the nuance information, and the one or more keywords, and output a message of recommending the task using the output module, when the end of the conversation is recognized.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$ first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
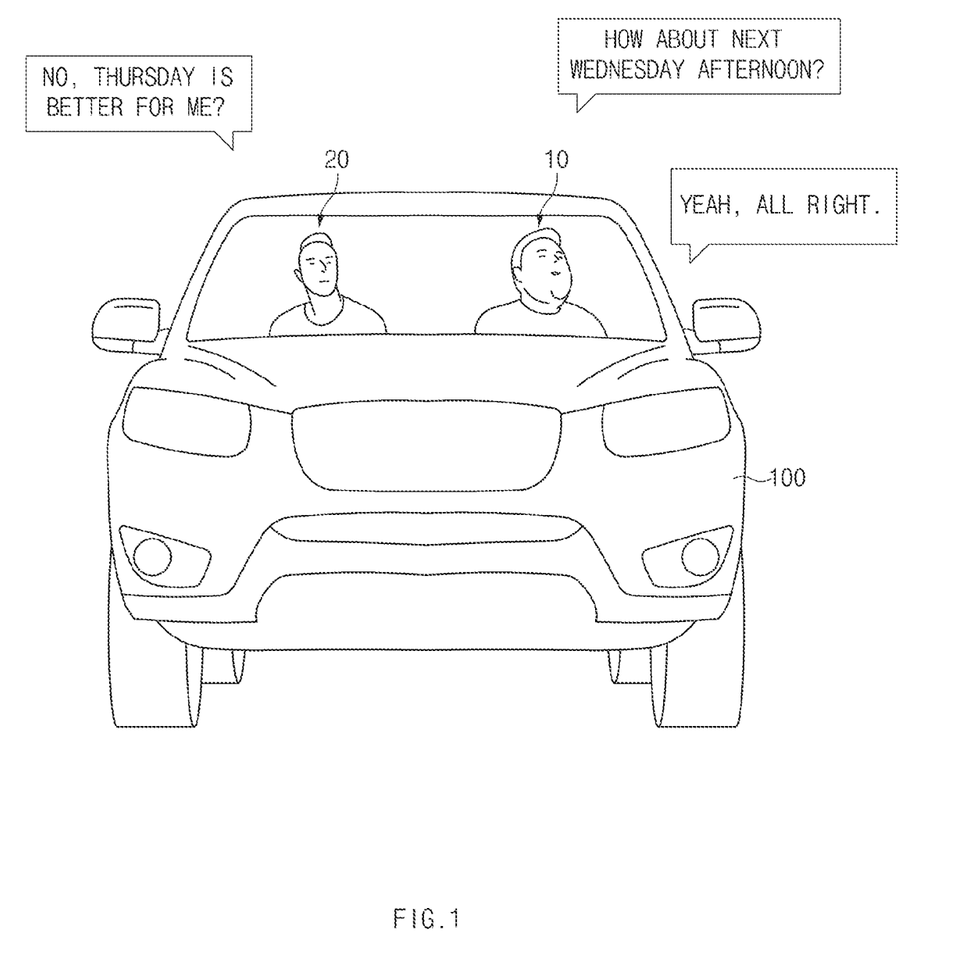
FIG. 1 is a drawing illustrating an environment where an apparatus for recommending a function of a vehicle is operated, according to an embodiment of the present disclosure.

FIG. 1 is a drawing illustrating an environment where an apparatus for recommending a function of a vehicle is operated, according to an embodiment of the present disclosure.

Referring to FIG. 1, a vehicle 100 according to an embodiment of the present disclosure may take on, for example, two users 10 and 20. The users 10 and 20 who ride in the vehicle 100 may talk with each other.

The vehicle 100 may recognize voices spoken by the users 10 and 20 using an input module such as a microphone. For example, the first user 10 may speak "How about next Wednesday afternoon?", and the second user 20 may reply that "No, Thursday is better for me?". Subsequently, the first user 10 may reply that "Yeah, all right".

According to an embodiment, the vehicle 100 may predict that the first user 10 has an intention to register a schedule, based on a word indicating the time "next Wednesday afternoon" included in a sentence spoken by the first user 10, a word for inquiring about the intention "how about", and the like. The vehicle 100 may obtain the time keyword "next Wednesday afternoon" from the sentence spoken by the first user 10 to register a schedule.

Subsequently, the vehicle 100 may determine that a sentence spoken by the second user 20 is associated with a previous sentence (e.g., the sentence spoken by the first user 10), based on the word "No" of expressing his or her own opinion on an opinion of a person to talk with, the word "Thursday" indicating a time, and the like, which are included in a sentence spoken by the second user 20. The vehicle 100 may determine that the sentence spoken by the second user 20 has a negative nuance, based on the word "No". The vehicle 100 may obtain the time keyword "Thursday" to register a schedule from the sentence spoken by the second user 20.

Subsequently, the vehicle 100 may determine that the sentence spoken by the first user 10 has a positive nuance, based on the words "Yeah" and "all right" included in the sentence second spoken by the first user 10.

The vehicle 100 may predict an action of a user (e.g., an information input for schedule registration) using information (e.g., intention information, correlation information, nuance information, a keyword, and/or the like) obtained from the recognized conversation and may recommend a task matched with the predicted action (e.g., registration of a schedule for next Thursday) (e.g., output the message "Do you wanna register a schedule for next Thursday"). A description will be given in detail of a detailed operation performed by the vehicle 100 according to an embodiment with reference to FIGS. 2 to 8.

Figure 2:
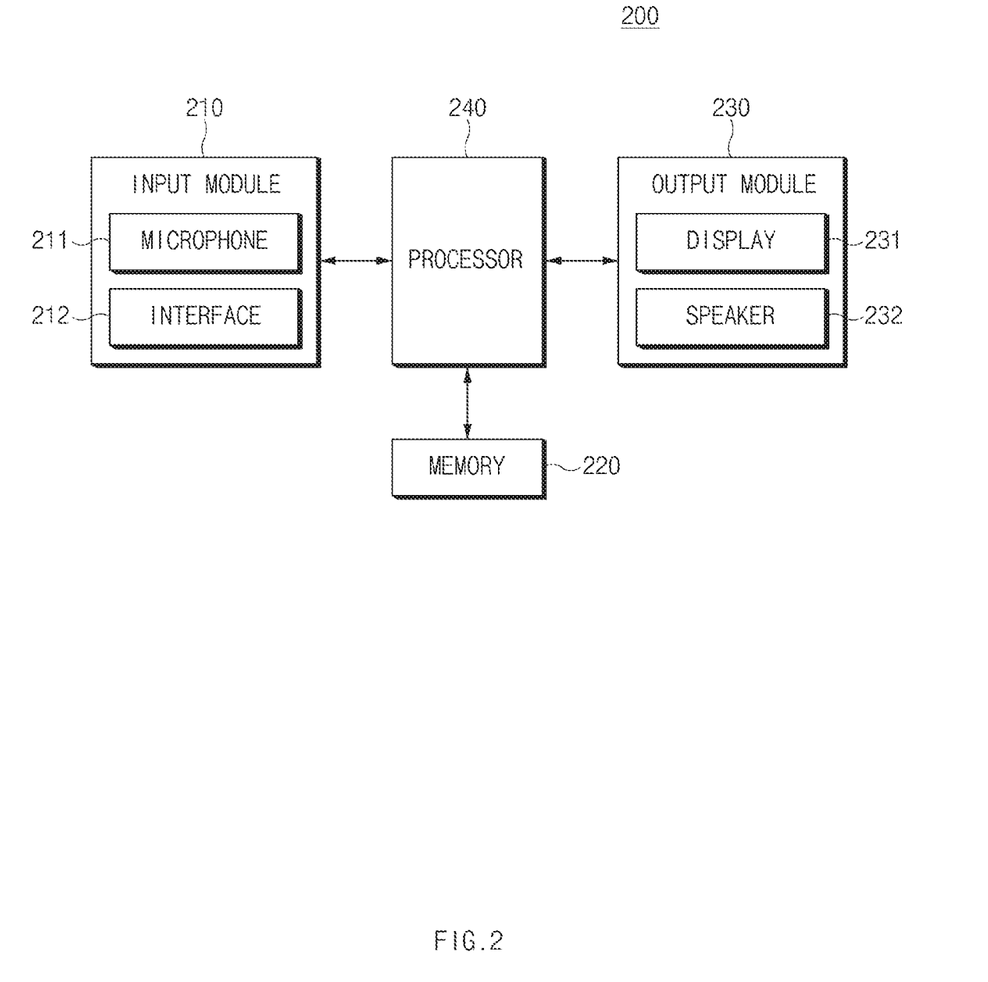
FIG. 2 is a block diagram illustrating a configuration of an apparatus for recommending a function of a vehicle according to an embodiment of the present disclosure.

FIG. 2 is a block diagram illustrating a configuration of an apparatus for recommending a function of a vehicle according to an embodiment of the present disclosure.

Referring to FIG. 2, an apparatus 200 for recommending a function of a vehicle according to an embodiment may include an input module 210, a memory 220, an output module 230, and a processor 240. In FIG. 2, for convenience of illustration, an embodiment is exemplified as each of the input module 210, the memory 220, the output module 230, and the processor 240 is configured with one block. However, embodiments are not limited thereto. For example, at least some of the input module 210, the memory 220, the output module 230, and the processor 240 may be implemented in the form of being integrated with each other or one another or being divided into two or more portions depending on an implementation method.

The input module 210 may be a device for receiving an input from the outside (e.g., a user of a vehicle). The input module 210 may include, for example, a microphone 211 and/or an interface 212 (e.g., a button, a touch screen, a screen, an electric path for receiving data from the outside, or the like). According to an embodiment, the input module 210 may detect a conversation between one or more users. The conversation between the users may be performed using, for example, a voice or text. For example, the input module 210 may receive a voice of a passenger, spoken in the vehicle, a voice of a called party, output through a speaker 232 of the vehicle, or the like. For another example, the input module 210 may receive a voice signal from an external device (e.g., a mobile phone of a passenger) (e.g., a voice signal of a called party, received by the mobile phone). For another example, the input module 210 may receive text data (e.g., a text message) originated or received by an external device (e.g., a mobile phone) of the user.

The memory 220 may include a volatile memory and/or a nonvolatile memory. The memory 220 may store data used by an element of the apparatus 200 for recommending the function in the vehicle. According to an embodiment, the memory 220 may store information associated with a conversation. The memory 220 may store at least a portion of a voice waveform, text data recognized from a voice, text data obtained from a message, or information obtained by analyzing the voice waveform and/or the text data. The memory 220 may store instructions and/or a database for executing operations performed by the processor 240.

The output module 230 may be a device for outputting a variety of sensorially recognizable information to the outside. The output module 230 may include, for example, the speaker 232 and/or a display 231. According to an embodiment, the output module 230 may output a voice message and/or a text message for recommending a task to the user.

The processor 240 may be communicatively connected with the input module 210, the memory 220, and the output module 230. The processor 240 may control the input module 210, the memory 220, and the output module 230 and may perform a variety of data processing and various arithmetic operations. The processor 240 is an electric circuitry that executes instructions of software which thereby performs various functions described hereinafter.

According to an embodiment, the processor 240 may obtain a plurality of sentences included in a conversation. The processor 240 may analyze a conversation detected by the input module 210 and may divide the conversation for each sentence based on the analyzed result to obtain a plurality of sentences included in the conversation. According to an embodiment, the processor 240 may receive voice data of one or more users using the input module 210 and may perform speech recognition based on the received voice data to obtain a plurality of sentences included in a conversation. For example, the processor 240 may obtain a plurality of sentences from a telephone call performed in the vehicle using the input module 210. For another example, the processor 240 may obtain a plurality of sentences from speaking of one or more users, occurred in the vehicle using the input module 210. According to an embodiment, the processor 240 may obtain a plurality of sentences included in a conversation by analyzing text data originated or received by one or more users using the input module 210. For example, the processor 240 may obtain a plurality of sentences from a text (e.g. a text message) received by the input module 210.

According to an embodiment, the processor 240 may obtain intention information indicating an action of the user, associated with each of a plurality of sentences, by analyzing each of the plurality of sentences included in a conversation. According to an embodiment, the processor 240 may obtain intention information indicating an action matched with each of the plurality of sentences by comparing a word included in each of the plurality of sentences with a database stored in the memory 220. For example, the processor 240 may compare a word included in a sentence with a dictionary database for determining an intention of the user. When a word included in a sentence is matched with a first dictionary database, the processor 240 may determine that a user who speaks the sentence has an intention corresponding to the first dictionary database. The intention of the user may correspond to, for example, route guidance, place search, music playback, schedule registration, a temperature increase, a temperature decrease, or the like.

According to an embodiment, the processor 240 may obtain correlation information indicating a correlation with a previous sentence from each of a plurality of sentences. For example, when a sentence includes a word (e.g., a reply, a demonstrative pronoun, or the like) indicating a correlation with a previous sentence, the processor 240 may determine that the sentence has the correlation with the previous sentence. For example, when a word included in a sentence is matched with a second dictionary database including words indicating a correlation with a previous sentence, the processor 240 may determine that the sentence has the correlation with the previous sentence.

According to an embodiment, the processor 240 may obtain nuance information indicating a positive, neutral, or negative meaning included in each of a plurality of sentences. For example, the processor 240 may obtain text data from each of the plurality of sentences and may obtain emotion information about each of the plurality of sentences by analyzing the text data, thus obtaining nuance information based on the emotion information. The processor 240 may recognize an emotion of the entire sentence using machine learning and may calculate a score for the emotion. The processor 240 may recognize an emotion included in a sentence using the method described in, for example, "Learning to Generate Reviews and Discovering Sentiment (Apr. 6, 2017)" of Alec Radford, Rafal Jozefowicz, and Ilya Sutskever. However, embodiments are not limited thereto. For example, the processor 240 may use various methods for recognizing an emotion. The processor 240 may obtain nuance information by comparing a threshold with a score. When the score is included within a specified range, the processor 240 may determine that a corresponding sentence has a neutral nuance. When the score is greater than a specified value (e.g., a maximum value in the specified range), the processor 240 may determine that the sentence has a positive nuance. When the score is greater than a specified value (e.g., a minimum value in the specified range), the processor 240 may determine that the sentence has a negative nuance.

According to an embodiment, the processor 240 may obtain text data from each of a plurality of sentences and compare the text data with a database stored in the memory 220 to obtain nuance information about each of the plurality of sentences. For example, the processor 240 may compare one or more words included in a sentence with a third dictionary database including words having a positive nuance. When the one or more words are matched with the third dictionary database, the processor 240 may determine that the sentence has the positive nuance.

According to an embodiment, the processor 240 may obtain nuance information about each of a plurality of sentences based on a waveform of a voice corresponding to each of the plurality of sentences detected by the input module 210. For example, the processor 240 may recognize an emotion with which a sentence is filled, based on an accent, a pitch, and the like of a voice, indicated on a waveform of a voice.

According to an embodiment, the processor 240 may obtain nuance information using all or some of the above-mentioned methods.

According to an embodiment, the processor 240 may obtain one or more keywords for executing a function associated with intention information among a plurality of functions embedded in the vehicle. The plurality of functions embedded in the vehicle may correspond to applications (e.g., a route guidance application, a media playback application, a scheduling application, a temperature control application, and the like) installed in the vehicle. For example, the processor 240 may determine a type of a keyword to be obtained based on intention information. For example, the processor 240 may obtain a location keyword from a sentence when the user has an intention to search for a route and may obtain a time keyword from the sentence when the user has an intention to register a schedule. The processor 240 may generate a slot for filling a keyword of a determined type. The processor 240 may fill the obtained keyword in the generated slot. When a demonstrative pronoun is included in a sentence, the processor 240 may obtain the demonstrative pronoun as a keyword and may treat the obtained keyword as being the same as a keyword of a previous sentence of the sentence including the demonstrative pronoun.

According to an embodiment, the processor 240 may determine a task, associated with a function, to be recommended to at least some of one or more users based on intention information, correction information, nuance information, and/or one or more keywords.

According to an embodiment, the processor 240 may determine a function mapped with intention information and may obtain one or more keywords for executing the function mapped with the intention information from each of a plurality of sentences, thus determining a task associated with the function based on nuance information and the at least one or more keywords. For example, the processor 240 may determine a function (e.g., navigation) mapped with intention information (e.g., route guidance) based on a database. The processor 240 may obtain a keyword (e.g., a location keyword) for executing the mapped function. The processor 240 may obtain a plurality of keywords (e.g., locations A and B) from a plurality of sentences included in a conversation. The processor 240 may determine a keyword (e.g., location A) matched with flow of a conversation among a plurality of keywords in consideration of nuance information and may determine a task (e.g., route guidance to location A) associated with a function based on the determined keyword. The term "function" in the specification may be a function embedded in the vehicle and may refer to, for example, a navigation function, a media playback function, a scheduling function, a temperature control function, and the like. The term "task" in the specification may refer to operations executable in a specific function. For example, the navigation function may include a task such as route guidance to a specific location and a search of the specific location.

According to an embodiment, the processor 240 may obtain intention information from a first sentence among a plurality of sentences and may obtain intention information from a second sentence subsequent to the first sentence among the plurality of sentences. When the intention information obtained from the first sentence differs from the intention information obtained from the second sentence, the processor 240 may disregard or delete intention information, nuance information, and one or more keywords obtained from each of sentences preceding the second sentence. For example, when intention information included in each of the first sentence and the second sentence indicates a route search and when intention information included in the third sentence indicates schedule registration, the processor 240 may disregard or delete intention information, nuance information, and a keyword obtained from the first sentence and the second sentence.

According to an embodiment, the processor 240 may obtain nuance information and one or more keywords from the first sentence among the plurality of sentences and may obtain nuance information form the second sentence subsequent to the first sentence. When it is determined that the second sentence has a positive meaning based on the nuance information obtained from the second sentence, the processor 240 may be configured to replace one or more keywords obtained from a sentence preceding the first sentence with the one or more keywords obtained from the first sentence. When it is determined that the second sentence has a negative meaning based on the nuance information obtained from the second sentence, the processor 240 may be configured to disregard or delete the one or more keywords obtained from the first sentence. For example, the processor 240 may obtain a first keyword from the first sentence. The processor 240 may obtain nuance information from the second sentence subsequent to the first sentence. When the second sentence has the positive nuance, since there is a high probability that a first keyword will be used in the flow of a conversation, the processor 240 may store the first keyword.

When the second sentence has the negative nuance, since there is a low probability that the first keyword will be used in the flow of the conversation, the processor 240 may disregard or delete the first keyword. The processor 240 may obtain a second keyword from the second sentence and may store, disregard, or delete the second keyword based on nuance information of the third sentence.

According to an embodiment, when the end of the conversation is recognized, the processor 240 may output a message of recommending a task using the output module 230. The processor 240 may repeat the above-mentioned processing for each of a plurality of sentences included in the conversation. The processor 240 may output a voice message or a text message of recommending a determined task using the output module 230.

Figure 3:
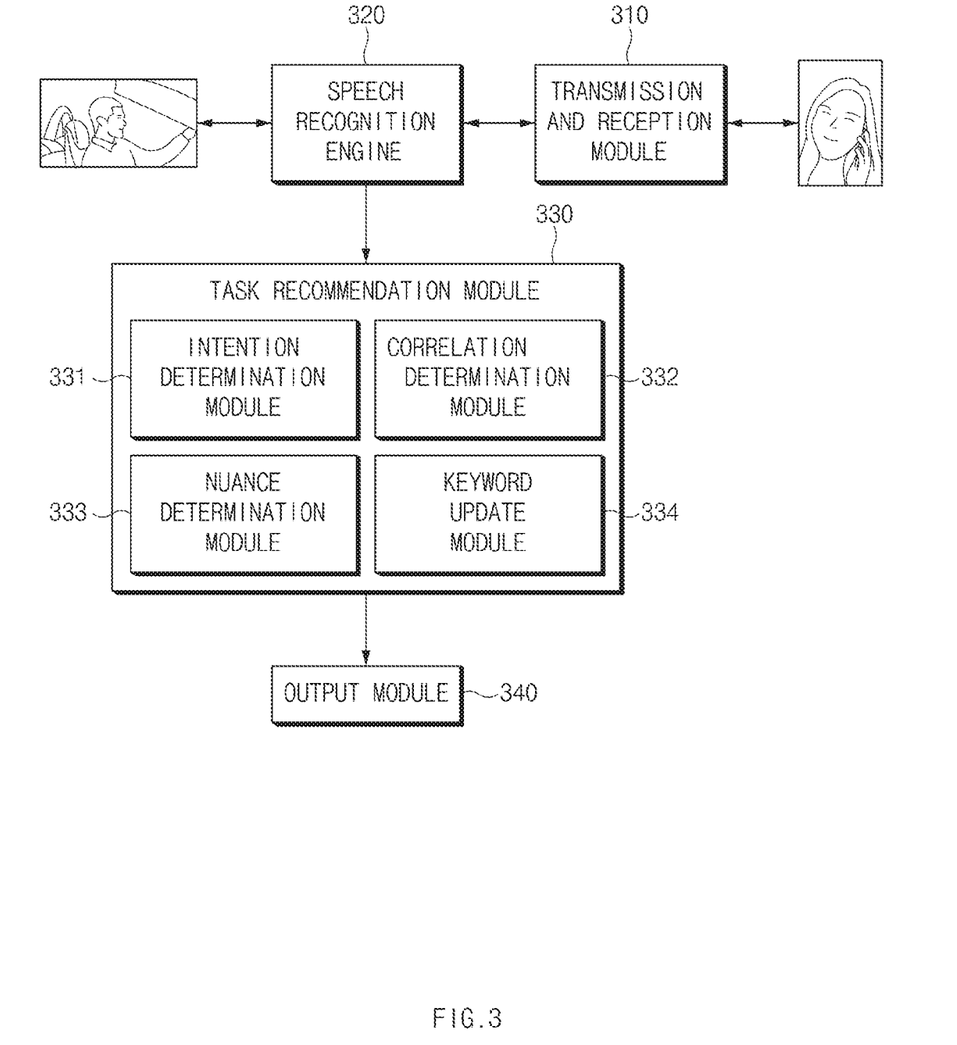
FIG. 3 is a block diagram illustrating a configuration of a software module included in an apparatus for recommending a function of a vehicle according to an embodiment of the present disclosure.

FIG. 3 is a block diagram illustrating a configuration of a software module included in an apparatus for recommending a function of a vehicle according to an embodiment of the present disclosure.

Referring to FIG. 3, the apparatus for recommending the function of the vehicle according to an embodiment may include a transmission and reception module 310, a speech recognition engine 320, a task recommendation module 330, and an output module 340. The processor 240 performs various functions of the modules 310, 320, 330, and 340. The modules 310, 320, 330, and 340 described below are implemented with software instructions executed on the processor 240.

The transmission and reception module 310 may obtain voice data from a device of a called party of a passenger of the vehicle. The transmission and reception module 310 may transmit the obtained voice data to the speech recognition engine 320.

The speech recognition engine 320 may obtain voice data obtained from the passenger of the vehicle and the voice data of the called party, obtained by the transmission and reception module 310. The speech recognition engine 320 may perform speech recognition based on the obtained voice data and obtain text data from the voice data based on the result of the speech recognition.

The task recommendation module 330 may include an intention determination module 331, a correlation determination module 332, a nuance determination module 333, and a keyword update module 334. The intention determination module 331 may determine an intention of a user from text data. The correlation determination module 332 may determine a correlation with a previous sentence from the text data. The nuance determination module 333 may recognize a positive nuance, a neutral nuance, or a negative nuance with which a sentence is filled. The keyword update module 334 may obtain keywords included in a sentence and may storage or update a keyword matched with a predicted action of the user among keywords based on intention information, correlation information, and nuance information.

The output module 340 may output a message of recommending a task corresponding to the stored keyword.

Figure 4:
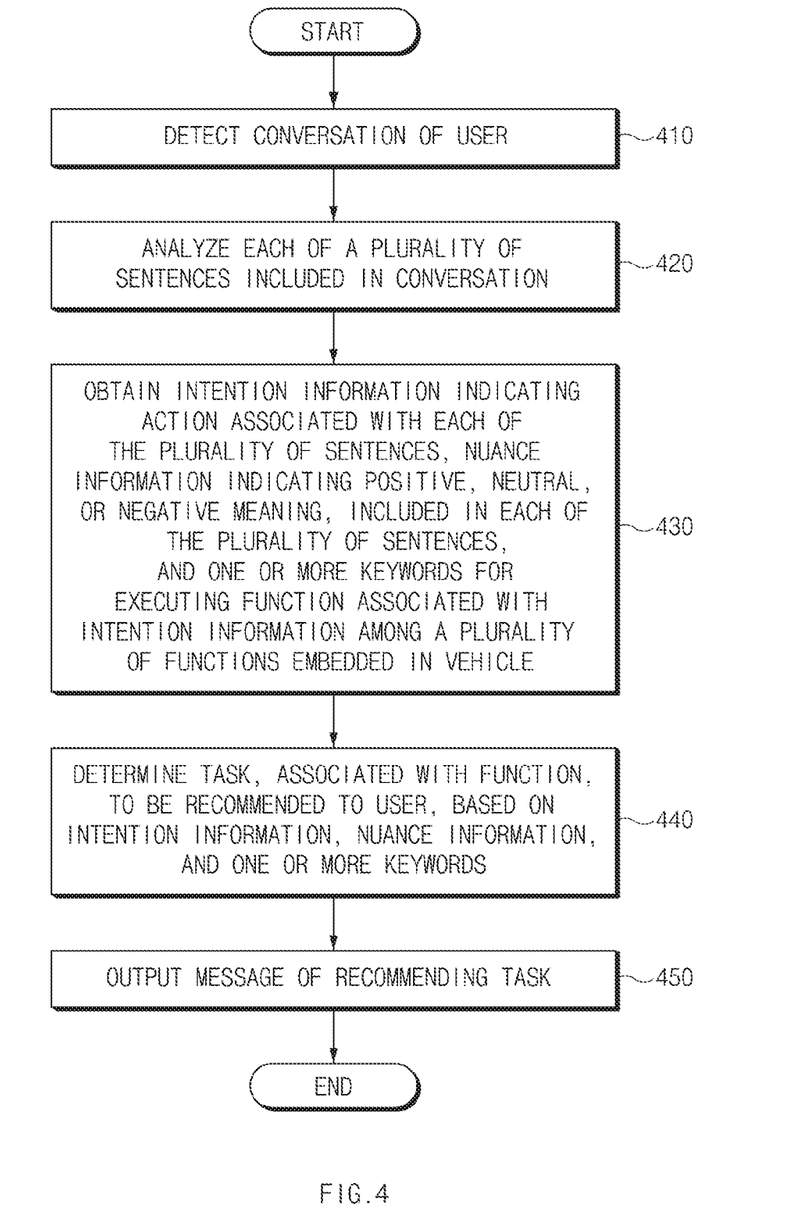
FIG. 4 is a flowchart illustrating a method for recommending a function of a vehicle according to an embodiment of the present disclosure.

FIG. 4 is a flowchart illustrating a method for recommending a function of a vehicle according to an embodiment of the present disclosure.

Hereinafter, it may be assumed that an apparatus 200 of FIG. 2 performs a process of FIG. 4. Further, in a description of FIG. 4, an operation described as being performed by an apparatus may be understood as being controlled by a processor 240 of the apparatus 200.

Referring to FIG. 4, in operation 410, the apparatus may detect a conversation of a user. For example, the apparatus may detect a conversation including the first sentence "How about next Wednesday afternoon?" of a first user, the second sentence "No, Thursday is better for me?" of a second user, and the third sentence "Yeah, all right." of the first user.

In operation 420, the apparatus may analyze each of a plurality of sentences included in the conversation. For example, the apparatus may recognize the plurality of sentences from the conversation by performing speech recognition based on the conversation.

In operation 430, the apparatus may obtain intention information indicating an action associated with each of the plurality of sentences, nuance information indicating a positive, neutral, or negative meaning included in each of the plurality of sentences, and one or more keywords for executing a function associated with the intention information among a plurality of functions embedded in the vehicle. For example, the apparatus may determine an intention to "register a schedule" from the first sentence and may obtain the time keyword "next Wednesday afternoon". The apparatus may determine a "negative nuance" from the second sentence and may obtain the time keyword "Thursday" (or "next Thursday afternoon"). When the "negative nuance" of the second sentence is determined, the apparatus may disregard or delete the time keyword "next Wednesday afternoon" obtained from the first sentence. The apparatus may determine a "positive nuance" from the third sentence and may store the time keyword "Thursday" (or "next Thursday afternoon").

In operation 440, the apparatus may determine a task, associated with the function, to be recommended to the user based on the intention information, the nuance information, and the one or more keywords. For example, the apparatus may determine a function to be recommended to the user as "schedule registration" based on the intention information and may determine a task to be recommended to the user as "schedule registration for next Thursday afternoon".

In operation 450, the apparatus may output a message of recommending the task. For example, the apparatus may output the voice message or the text message "Do you wanna register a schedule for next Thursday afternoon?".

Figure 5:
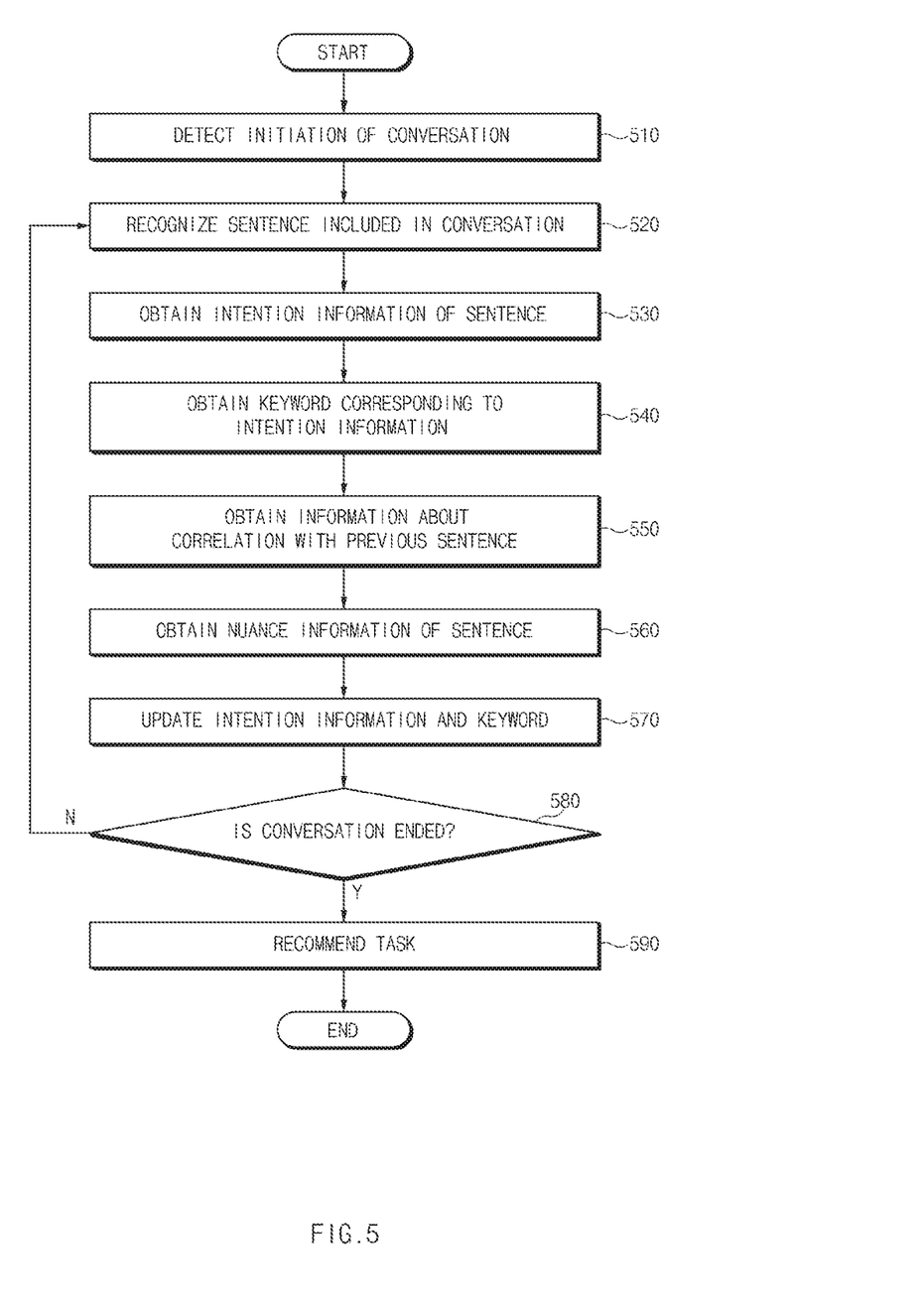
FIG. 5 is a flowchart illustrating a method for recommending a function of a vehicle according to an embodiment of the present disclosure.

FIG. 5 is a flowchart illustrating a method for recommending a function of a vehicle according to an embodiment of the present disclosure.

Hereinafter, it may be assumed that an apparatus 200 of FIG. 2 performs a process of FIG. 5. Further, in a description of FIG. 5, an operation described as being performed by an apparatus may be understood as being controlled by a processor 240 of the apparatus 200.

Referring to FIG. 5, in operation 510, the apparatus may detect initiation of a conversation. In operation 520, the apparatus may recognize a sentence included in the conversation. In operation 530, the apparatus may obtain intention information of the sentence. In operation 540, the apparatus may obtain a keyword corresponding to the intention information. When a keyword corresponding to the intention information is not included in the sentence recognized in operation 520, operation 540 may be omitted. In operation 550, the apparatus may obtain information about a correlation with a previous sentence. When the sentence recognized in operation 520 is an initial sentence in the conversation, operation 550 may be omitted. In operation 560, the apparatus may obtain nuance information of the sentence. In operation 570, the apparatus may update the intention information and the keyword. In operation 580, the apparatus may determine whether the conversation is ended. When the conversation is not ended, that is, when a next sentence is spoken, the apparatus may repeat operations 520 to 570 for the next sentence. In operation 590, the apparatus may recommend a task.

Figure 6:
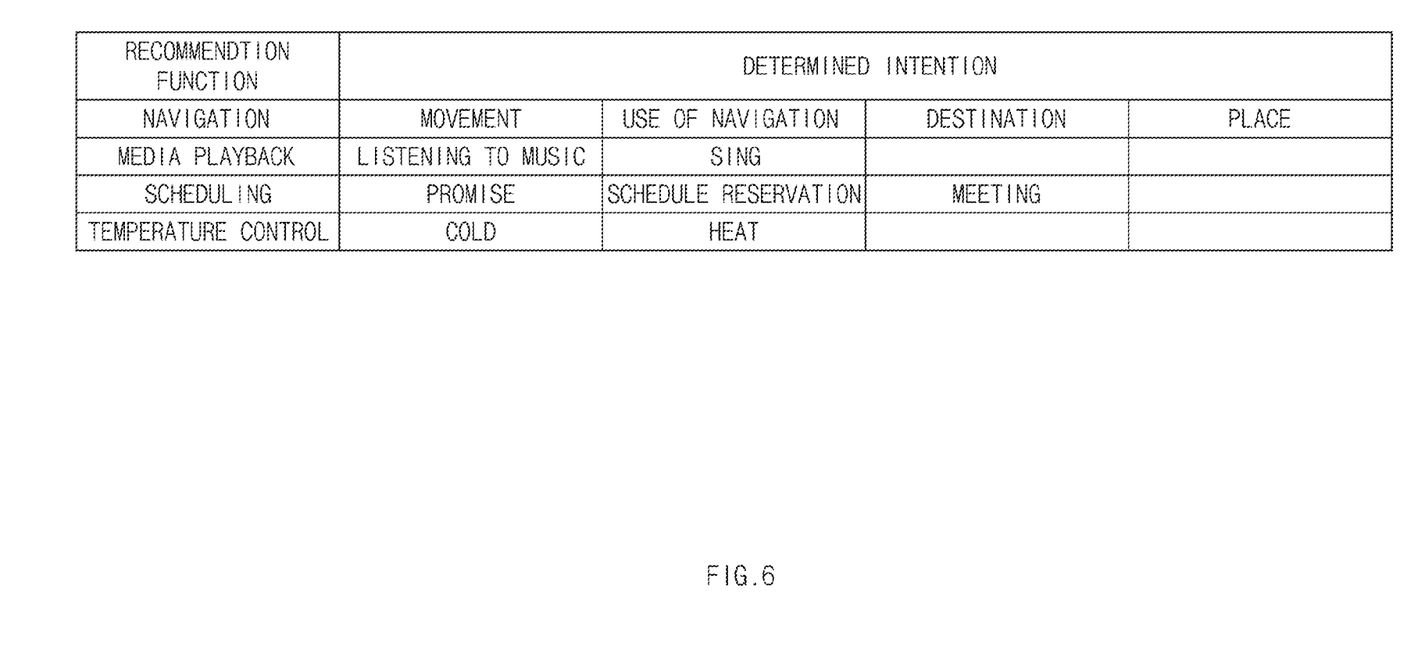
FIG. 6 is a drawing illustrating a correction between intention information obtained by an apparatus and a function according to an embodiment of the present disclosure.

FIG. 6 is a drawing illustrating a correction between intention information obtained by an apparatus and a function according to an embodiment of the present disclosure.

Referring to FIG. 6, the apparatus (e.g., an apparatus 220 for recommending a function of a vehicle) according to an embodiment may determine an intention of a user from a sentence included in a conversation. For example, the apparatus may obtain intention information such as movement, use of navigation, a destination, or a place. When the intention information is obtained, the apparatus may determine that a function the user wants is a navigation function. For another example, the apparatus may obtain intention information such as listening to music or a sing. When the intention information is obtained, the apparatus may determine that a function the user wants is a media playback function. For another example, the apparatus may obtain intention information such as a promise, schedule reservation, or a meeting. When the intention information is obtained, the apparatus may determine that a function the user wants is a scheduling function. For another example, the apparatus may obtain intention information such as cold or heat. When the intention is obtained, the apparatus may determine that a function the user wants is a temperature control function.

Figure 7:
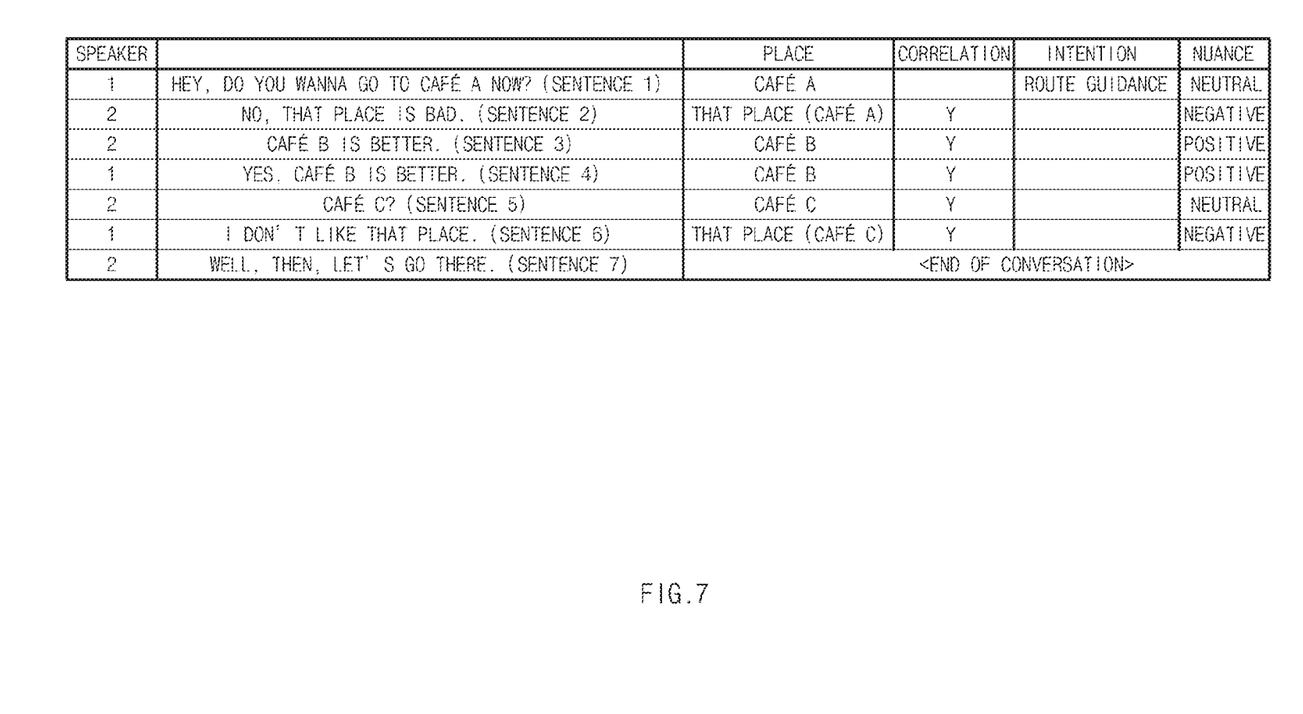
FIG. 7 is a drawing illustrating sentences recognized by an apparatus and exemplary information obtained from the sentences according to an embodiment of the present disclosure.

FIG. 7 is a drawing illustrating sentences recognized by an apparatus and exemplary information obtained from the sentences according to an embodiment of the present disclosure.

Referring to FIG. 7, the apparatus (e.g., an apparatus 200 for recommending a function of a vehicle) according to an embodiment may obtain a variety of information from a conversation between two users. For example, the apparatus may obtain the intention information "route guidance", the place keyword "café A", the nuance information "neutral" from a first sentence. The apparatus may obtain the correlation information "Y", the place keyword "that place (café A)", and the nuance information "negative" from a second sentence. The apparatus may obtain the correlation information "Y", the place keyword "café B", and the nuance information "positive" from a third sentence. The apparatus may obtain the correlation information "Y", the place keyword "café B", and nuance information "positive" from a fourth sentence. The apparatus may obtain the correlation information "Y", the place keyword "café C", and the nuance information "neutral" from a fifth sentence. The apparatus may obtain the correlation information "Y", the place keyword "that place (café C)", and the nuance information "negative" from a sixth sentence. The apparatus may recognize end of the conversation from a seventh sentence. Although not described above, the apparatus may further obtain speaker information and time information based on a waveform of a voice. The apparatus according to an embodiment may recommend a task using the obtained information. A description will be given below of a detailed operation of recommending the task using the information shown in FIG. 7 with reference to FIG. 8.

Figure 8:
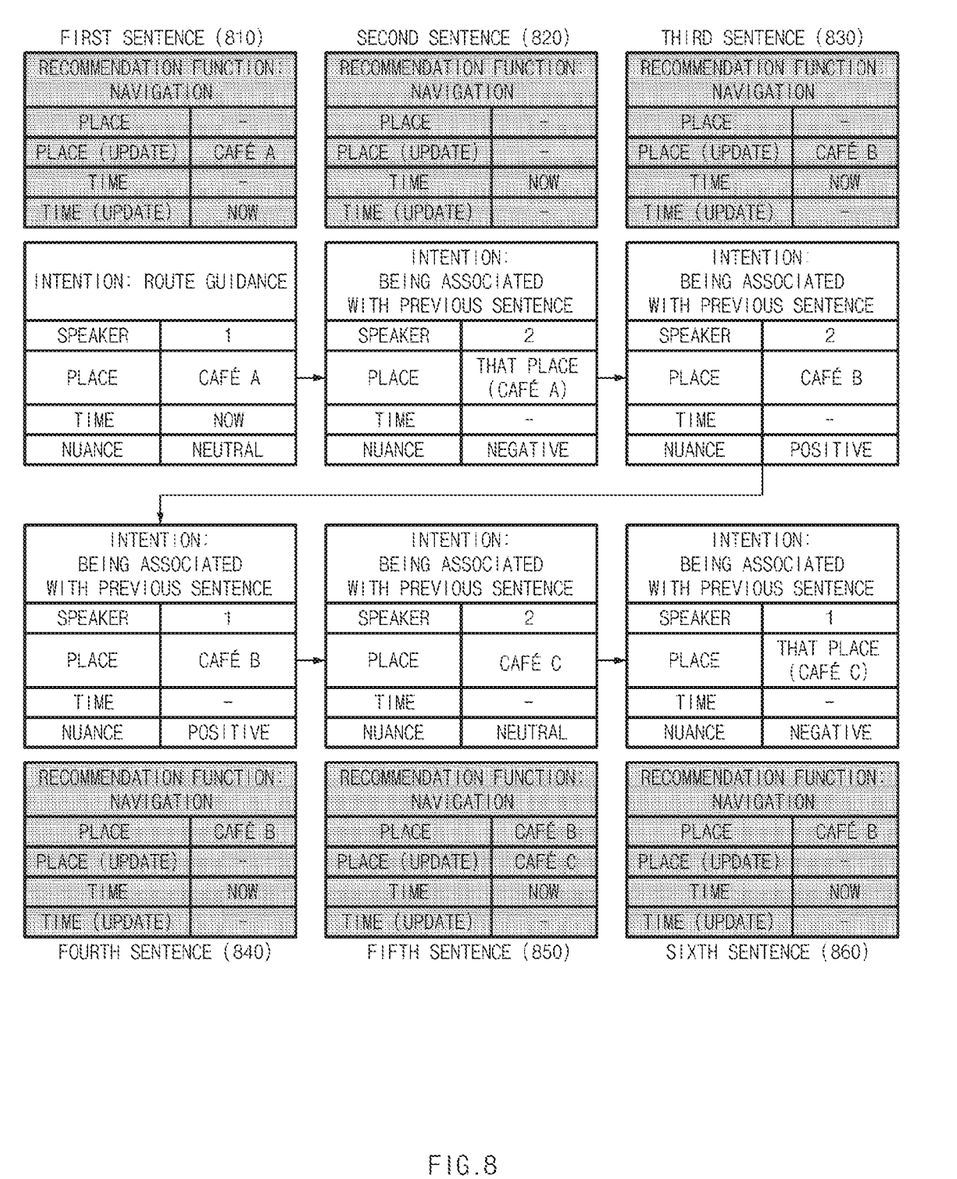
FIG. 8 is a drawing illustrating an exemplary operation of an apparatus according to an embodiment of the present disclosure.

FIG. 8 is a drawing illustrating an exemplary operation of an apparatus according to an embodiment of the present disclosure.

Referring to FIG. 8, the apparatus (e.g., an apparatus 200 for recommending a function of a vehicle) according to an embodiment may obtain the intention information "route guidance" from a first sentence 810. The apparatus may generate a slot (place) for storing place information for executing a task included in a "navigation" function which is a function corresponding to the intention "route guidance", a slot (time) to store time information, a slot (place (update)) to preliminarily store the place information, and a slot (time (update)) to preliminarily store the time information.

The apparatus may obtain the speaker information "1", the place information "café A", the time information "now", and the nuance information "neutral" from the first sentence 810. When the nuance information of the first sentence 810 is "neutral", the apparatus may store the place information "café A" in the place (update) slot and may store the time information "now" in the time (update) slot.

The apparatus may obtain the correlation information "Y", the speaker information "2", the place information "that place (café A)", and the nuance information "negative" from a second sentence 820. Since the correlation information is "Y", the apparatus may maintain the generated slot. Since the second sentence 820 has the negative nuance for the place information "that place (café A)", the apparatus may delete information stored in the place (update) slot. Since the second sentence 820 does not have a nuance for the time information "now", the apparatus may move the "now" stored in the time (update) slot to the time slot.

The apparatus may obtain the correlation information "Y", the speaker information "2", the place information "café B" and the nuance information "positive" from a third sentence 830. When the nuance information of the third sentence 830 is "positive", the apparatus may store the place information "café B" in the place (update) slot. Since time information is not included in the third sentence 830, the apparatus may maintain information stored in the time slot and the time (update) slot.

The apparatus may obtain the correlation information "Y", the speaker information "1", the place information "café B", and the nuance information "negative" from a fourth sentence 840. Since the fourth sentence 840 has the positive nuance for the place information "café B", the apparatus may move the "café B" stored in the place (update) slot to the place slot.

The apparatus may obtain the speaker information "2", the place information "café C", and the nuance information "neutral" from a fifth sentence 850. When the nuance information of the fifth sentence 850 is "neutral", the apparatus may store the place information "café C" in the place (update) slot.

The apparatus may obtain the correlation information "Y", the speaker information "1", the place information "that place (café C)", and the nuance information "negative" from a sixth sentence 860. Since the sixth sentence 860 has the negative nuance for the place information "that place (café C)", the apparatus may delete information stored in the place (update) slot.

When the conversation is ended, the apparatus may output a recommendation message based on information stored in the place slot and the time slot. For example, the apparatus may output a voice message "Do you wanna start route guidance now to café B?" based on information stored in the slots.

Figure 9:
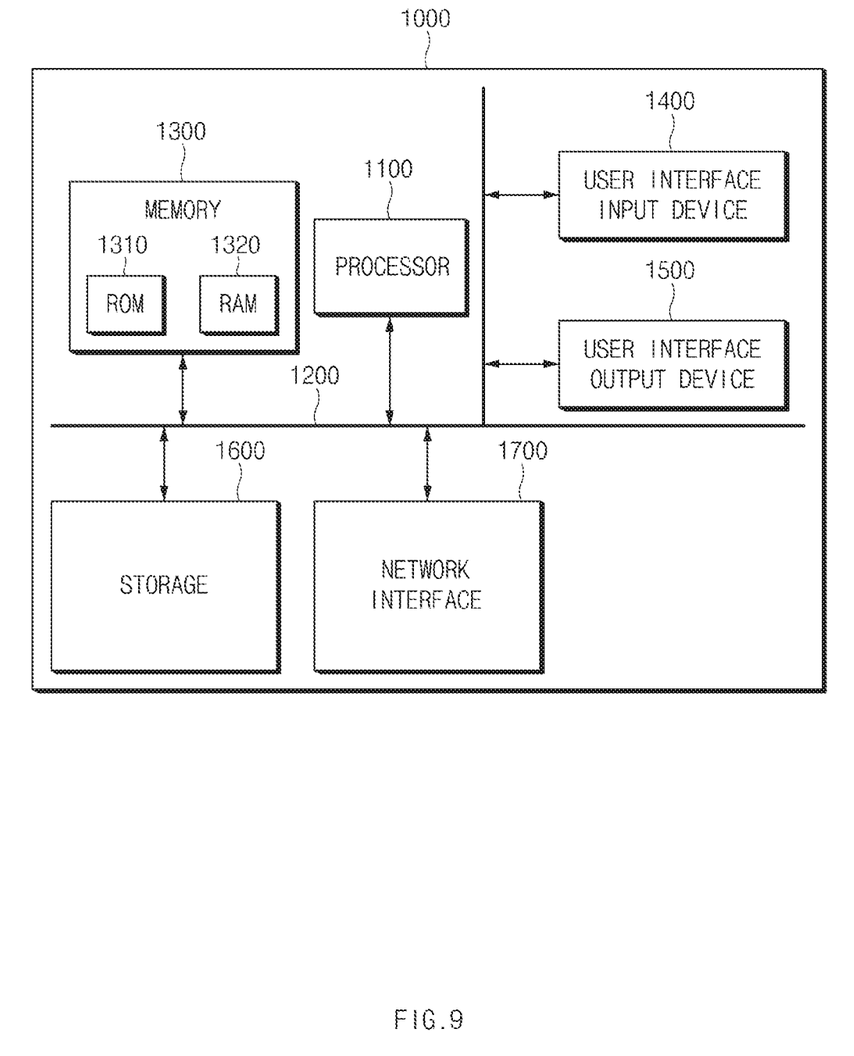
FIG. 9 is a block diagram illustrating a configuration of a computing system for executing a user input processing method according to an embodiment of the present disclosure.

FIG. 9 is a block diagram illustrating a configuration of a computing system for executing a user input processing method according to an embodiment of the present disclosure.

Referring to FIG. 9, the above-mentioned user input processing method according to an embodiment of the present disclosure may be implemented through the computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus and method for recommending the function of the vehicle according to an embodiment of the present disclosure may enhance the probability of recommending a task matched with a conversation by predicting an action of the user based on intention information, nuance information, one or more keywords, and the like obtained from the conversation.

In addition, various effects indirectly or directly ascertained through the present disclosure may be provided.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for recommending a function of a vehicle, the apparatus comprising:
    an input module for detecting a conversation among a plurality of users;
    a memory for storing information associated with the conversation;
    an output module; and
    a processor communicatively connected with the input module, the memory, and the output module,
    wherein the processor is configured to:
    obtain intention information indicating an action associated with each of a plurality of sentences included in the conversation, nuance information indicating a positive, neutral, or negative meaning included in each of the plurality of sentences, and one or more keywords for executing a function associated with the intention information among a plurality of functions embedded in the vehicle by analyzing each of the plurality of sentences;

determine a task, associated with the function, to be recommended to at least some of the plurality of users, based on the intention information, the nuance information, and the one or more keywords;

output a message of recommending the task through the output module, where an end of the conversation is recognized;

obtain intention information from a first sentence among the plurality of sentences;

obtain intention information from a second sentence subsequent to the first sentence among the plurality of sentences; and disregard or delete intention information, nuance information, and one or more keywords obtained from each of sentences preceding the second sentence, where the intention information obtained from the first sentence differs from the intention information obtained from the second sentence.

2. The apparatus of claim 1, wherein the processor is further configured to:

obtain the plurality of sentences from a telephone call conducted in the vehicle using the input module.

3. The apparatus of claim 1, wherein the processor is further configured to:

obtain the plurality of sentences from a text received by the input module.

4. The apparatus of claim 1, wherein the processor is further configured to:

obtain the plurality of sentences from speaking of the plurality of users, the speaking occurring in the vehicle using the input module.

5. The apparatus of claim 1, wherein the processor is further configured to:

obtain the intention information indicating the action matched with each of the plurality of sentences by comparing a word included in each of the plurality of sentences with a database stored in the memory.

6. The apparatus of claim 1, wherein the processor is further configured to:

obtain correlation information indicating a correlation with a previous sentence from each of the plurality of sentences; and determine the task based on the intention information, the nuance information, the one or more keywords, and the correlation information.

7. The apparatus of claim 1, wherein the processor is further configured to:

obtain text data from each of the plurality of sentences;

obtain emotion information about each of the plurality of sentences by analyzing the text data; and obtain the nuance information based on the emotion information.

8. The apparatus of claim 1, wherein the processor is further configured to:

obtain text data from each of the plurality of sentences; and obtain the nuance information about each of the plurality of sentences by comparing the text data with a database stored in the memory.

9. The apparatus of claim 1, wherein the processor is further configured to:

obtain the nuance information about each of the plurality of sentences based on a waveform of a voice corresponding to each of the plurality of sentences detected by the input module.

10. The apparatus of claim 1, wherein the processor is further configured to:

determine a function mapped with the intention information;

obtain the one or more keywords from each of the plurality of sentences for executing the function mapped with the intention information; and determine the task associated with the function based on the nuance information and the one or more keywords.

11. The apparatus of claim 1, wherein the processor is further configured to:

determine a type of the one or more keywords based on the intention information.

12. The apparatus of claim 1, wherein the processor is further configured to:

obtain nuance information and one or more keywords from a first sentence among the plurality of sentences;

obtain nuance information from a second sentence subsequent to the first sentence among the plurality of sentences;

replace one or more keywords obtained from a sentence preceding the first sentence with the one or more keywords obtained from the first sentence, where it is determined that the second sentence has a positive meaning based on the nuance information obtained from the second sentence; and disregard or delete the one or more keywords obtained from the first sentence, where it is determined that the second sentence has a negative meaning based on the nuance information obtained from the second sentence.

13. A method for recommending a function of a vehicle, the method comprising:

detecting, by an input module, a conversation, obtaining, by a processor, intention information indicating an action associated with each of a plurality of sentences, nuance information indicating a positive, neutral, or negative meaning included in each of the plurality of sentences, and one or more keywords for executing a function associated with the intention information among a plurality of functions embedded in the vehicle by analyzing each of the plurality of sentences, the plurality of sentences included in the conversation among a plurality of users;

determining, by the processor, a task, associated with the function, to be recommended to at least some of the plurality of users, based on the intention information, the nuance information, and the one or more keywords; and outputting, by an output module, a message of recommending the task, where an end of the conversation is recognized, wherein the obtaining the intention information, the nuance information and the one or more keywords includes:

obtaining, by the processor, intention information from a first sentence among the plurality of sentences;

obtaining, by the processor, intention information from a second sentence subsequent to the first sentence among the plurality of sentences; and disregarding or deleting, by the processor, intention information, nuance information, and one or more keywords obtained from each of sentences preceding the second sentence, where the intention information obtained from the first sentence differs from the intention information obtained from the second sentence.

14. The method of claim 13, wherein the obtaining the intention information includes:
obtaining, by the processor, the intention information indicating the action matched with each of the plurality of sentences by comparing a word included in each of the plurality of sentences with a prestored database.

15. The method of claim 13, further comprising:
obtaining, by the processor, correlation information indicating a correlation with a previous sentence from each of the plurality of sentences, and
wherein the determining the task includes:
determining, by the processor, the task based on the intention information, the nuance information, the one or more keywords, and the correlation information.

16. The method of claim 13, wherein the obtaining the intention information, the nuance information and the one or more keywords includes:
obtaining, by the processor, nuance information and one or more keywords from a first sentence among the plurality of sentences;
obtaining, by the processor, nuance information from a second sentence subsequent to the first sentence among the plurality of sentences;
replacing, by the processor, one or more keywords obtained from a sentence preceding the first sentence with the one or more keywords obtained from the first sentence, where it is determined that the second sentence has a positive meaning based on the nuance information obtained from the second sentence; and
disregarding or deleting, by the processor, the one or more keywords obtained from the first sentence, where it is determined that the second sentence has a negative meaning based on the nuance information obtained from the second sentence.

17. An apparatus for recommending a function of a vehicle, the apparatus comprising:
a microphone configured to detect speaking of one or more users;
a memory storing information associated speaking;
an output module; and
a processor communicatively connected with the microphone, the memory, and the output module,
wherein the processor is configured to:
perform speech recognition for a plurality of sentences included in the speaking;
obtain first information including intention of each of the plurality of sentences, second information including nuance of each of the plurality of sentences, and one or more keywords associated with at least one of a plurality of applications embedded in the vehicle based on a result of the speech recognition;
determine a task to be executed using the at least one of the plurality of applications, based on the first information, the second information, and the one or more keywords;
execute the task using the at least one of the plurality of applications, where an end of the speaking is recognized;
obtain intention information from a first sentence among the plurality of sentences;
obtain intention information from a second sentence subsequent to the first sentence among the plurality of sentences; and
disregard or delete intention information, nuance information, and one or more keywords obtained from each of sentences preceding the second sentence, where the intention information obtained from the first sentence differs from the intention information obtained from the second sentence.

18. The apparatus of claim 17, wherein the output module comprises at least one of a speaker or a display.

19. The apparatus of claim 17, wherein the processor is further configured to:
obtain the first information by inferring an action of the one or more users associated with each of the plurality of sentences.

20. The apparatus of claim 17, wherein the processor is further configured to:
obtain the second information by extracting a positive, neutral, or negative meaning included in each of the plurality of sentences.

21. The apparatus of claim 17, wherein the processor is further configured to:
obtain the first information, the second information, and the one or more keywords based on a waveform of the speaking and the result of the speech recognition.

22. The apparatus of claim 17, wherein the processor is further configured to:
output a message of recommending the task using the output module, where the end of the speaking is recognized; and
execute the task using the at least one of the plurality of applications, where an execution of the task is approved by the one or more users.

* * * * *